US011093527B2

(12) United States Patent
Edeen et al.

(10) Patent No.: US 11,093,527 B2
(45) Date of Patent: *Aug. 17, 2021

(54) FRAMEWORK FOR CONTINUOUS PROCESSING OF A SET OF DOCUMENTS BY MULTIPLE SOFTWARE APPLICATIONS

(71) Applicant: International Business Machines Corporation, Armonk, NY (US)

(72) Inventors: Eric L. Edeen, Sammamish, WA (US); Robert M. Kreuch, Kirkland, WA (US); Michael R. C. Seaman, Impington (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/628,052

(22) Filed: Feb. 20, 2015

(65) Prior Publication Data
US 2015/0254324 A1 Sep. 10, 2015

Related U.S. Application Data

(63) Continuation of application No. 14/200,701, filed on Mar. 7, 2014.

(51) Int. Cl.
*G06F 16/28* (2019.01)
*H04L 29/08* (2006.01)
*G06F 16/23* (2019.01)

(52) U.S. Cl.
CPC ........ *G06F 16/284* (2019.01); *G06F 16/2308* (2019.01); *H04L 67/10* (2013.01)

(58) Field of Classification Search
CPC ..... H04L 67/10; G06F 16/284; G06F 16/2308
See application file for complete search history.

(56) References Cited

U.S. PATENT DOCUMENTS 5,666,490 A * 9/1997 Gillings ............ G06F 17/30265
705/301
5,920,873 A * 7/1999 Van Huben ............ G06Q 10/04
(Continued)

FOREIGN PATENT DOCUMENTS

EP 2407900 A1 * 1/2012 ....... G06F 17/30663
WO 2009075987 A3 6/2009

OTHER PUBLICATIONS

User's Manual for the Examiners Automated Search Tool (EAST) 2.1, May 5, 2006, pp. 6-48 and 6-49 (Year: 2006).*

(Continued)

*Primary Examiner* — Matthew J Ellis
(74) *Attorney, Agent, or Firm* — Konrad Raynes Davda & Victor LLP; Janaki K. Davda

(57) ABSTRACT

Described are techniques for providing a framework having a scanning control for selecting a batch of documents using configuration data and a process control for processing the batch of documents. Under control of the framework, the batch of documents is sent to a plurality of subscribed applications serially, wherein the batch of documents is selected based on a high key value stored in the configuration data, and wherein each of the subscribed applications subscribes with the framework to process a document type, and the stored high key value in the configuration data is updated for use in selecting another batch of documents.

7 Claims, 12 Drawing Sheets

(56) References Cited

U.S. PATENT DOCUMENTS

| | | | |
|---|---|---|---|
| 7,171,619 | B1 | 1/2007 | Bianco |
| 7,328,263 | B1* | 2/2008 | Sadjadi ............... G06F 9/526 707/999.008 |
| 7,383,263 | B2 | 6/2008 | Goger |
| 9,003,062 | B1* | 4/2015 | Nampally ............ G06F 9/5055 709/246 |
| 2004/0002972 | A1* | 1/2004 | Father ................... G06F 9/542 |
| 2005/0044145 | A1* | 2/2005 | Quinn .................. H04L 29/06 709/205 |
| 2006/0149747 | A1* | 7/2006 | Bair ............... G06F 17/30017 |
| 2008/0109454 | A1* | 5/2008 | Willse .................. G06F 16/313 |
| 2008/0148261 | A1* | 6/2008 | Ferlitsch ............. G06F 9/4843 718/101 |
| 2009/0006402 | A1* | 1/2009 | Bohle ................... G06F 9/526 |
| 2009/0112939 | A1 | 4/2009 | Sanghvi et al. |
| 2009/0171950 | A1* | 7/2009 | Lunenfeld .......... G06Q 30/0601 |
| 2009/0204613 | A1* | 8/2009 | Muroi .................. G06F 21/56 |
| 2009/0319518 | A1* | 12/2009 | Koudas ............ G06F 17/30864 |
| 2010/0333111 | A1* | 12/2010 | Kothamasu .......... H04L 12/5855 719/313 |
| 2011/0131192 | A1* | 6/2011 | Finnie ................ G06F 16/2343 707/704 |
| 2011/0137861 | A1* | 6/2011 | Burnett .............. G06F 16/2308 707/622 |
| 2011/0208766 | A1* | 8/2011 | Lang ..................... G06Q 10/10 707/759 |
| 2012/0036125 | A1 | 2/2012 | Al-Kofahi et al. |
| 2012/0151382 | A1 | 6/2012 | Zhang et al. |
| 2013/0054636 | A1* | 2/2013 | Tang .................... G06F 17/241 707/769 |
| 2015/0066800 | A1* | 3/2015 | Hawes, III ............ G06Q 10/06 705/342 |
| 2015/0207623 | A1* | 7/2015 | Pan Dian .............. G06F 16/116 713/165 |

OTHER PUBLICATIONS

Candan, K.S., B. Prabhakaran, and V.S. Subrahmanian, "CHIMP: A Framework for Supporting Distributed Multimedia Document Authoring and Presentation", ACM MULTIMEDIA '96 Proceedings of the Fourth ACM International Conference on Multimedia, pp. 329-340, 1996 [Also Total 12 pp.].

Mell, P. and T. Grance, "Effectively and Securely Using the Cloud Computing Paradigm", NIST, Information Technology Laboratory, Oct. 7, 2009, Total 80 pp.

Mell, P. and T. Grance, "The NIST Definition of Cloud Computing (Draft)", National Institute of Standards and Technology, Jan. 2011, Total 7 pp.

Preliminary Amendment, dated Feb. 20, 2015, for U.S. Appl. No. 14/200,701, filed Mar. 7, 2014 by E.L. Edeen et al., Total 5 pp. [57.320 (PrelimAmend)].

U.S. Appl. No. 14/200,701, filed Mar. 7, 2014, entitled, "Framework for Continuous Processing of a Set of Documents by Multiple Software Applications", invented by E.L. Edeen et al., Total 45 pp.

Office Action 1, dated Jan. 29, 2016, for U.S. Appl. No. 14/200,701, filed Mar. 7, 2014 by E.L. Edeen et al., Total 24 pp.

Response to Office Action 1, dated Apr. 29, 2016, for U.S. Appl. No. 14/200,701, filed Mar. 7, 2014 by E.L. Edeen et al., Total 12 pp.

Final Office Action, dated Aug. 9, 2016, for U.S. Appl. No. 14/200,701, filed Mar. 7, 2014 by E.L. Edeen et al., Total 21 pp.

Response to Final Office Action, dated Nov. 8, 2016, for U.S. Appl. No. 14/200,701, filed Mar. 7, 2014 by E.L. Edeen et al., Total 10 pp.

Office Action, dated May 18, 2017, for U.S. Appl. No. 14/200,701, filed Mar. 7, 2014 by E.L. Edeen et al., Total 21 pages.

Response to Office Action, dated Aug. 15, 2017, for U.S. Appl. No. 14/200,701, filed Mar. 7, 2014 by E.L. Edeen et al., Total 11 pages.

Final Office Action 2, dated Nov. 3, 2017, for U.S. Appl. No. 14/200,701, filed Mar. 7, 2014 by E.L Edeen et al., Total 22 pp.

Response to Final Office Action 2, dated Feb. 1, 2018, for U.S. Appl. No. 14/200,701, filed Mar. 7, 2014 by E.L. Edeen et al., Total 12 pp.

Office Action 5 for U.S. Appl. No. 14/200,701 pp. 28, dated Apr. 27, 2018.

Response to Office Action 5 for U.S. Appl. No. 14/200,701 pp. 21, dated Jul. 27, 2018.

Final Office Action 3 for U.S. Appl. No. 14/200,701, pp. 21, dated Sep. 4, 2018.

Response to Final Office Action 3 for U.S. Appl. No. 14/200,701, pp. 12, dated Jan. 2, 2019.

Office Action, for U.S. Appl. No. 14/200,701, pp. 22, dated Mar. 21, 2019.

Response to Office Action, for U.S. Appl. No. 14/200,701, pp. 14 , dated Jun. 21, 2019.

Final Office Action 4 for U.S. Appl. No. 14/200,701, 21 pp., dated Aug. 8, 2019.

Response to Final Office Action 4 for U.S. Appl. No. 14/200,701, 14 pp., dated Nov. 8, 2019.

Office Action 9 for U.S. Appl. No. 141200,701, 22 pp., dated Jan. 10, 2020.

Response to Office Action 9 for U.S. Appl. No. 14/200,701, 12 pp., dated Apr. 10, 2020.

Final Office Action 5 for U.S. Appl. No. 14/200,701, 19 pp., dated Jul. 14, 2020.

Response to Final Office Action 5 for U.S. Appl. No. 14/200,701, 12 pp., dated Oct. 14, 2020.

Notice of Allowance for U.S. Appl. No. 14/200,701, 15 pp., dated Mar. 17, 2021.

312 Amendment for U.S. Appl. No. 14/200,701, 9 pp., dated Apr. 19, 2021.

* cited by examiner

FRAMEWORK FOR CONTINUOUS PROCESSING OF A SET OF DOCUMENTS BY MULTIPLE SOFTWARE APPLICATIONS

BACKGROUND

Embodiments of the invention relate to a framework for continuous processing of a set of documents (e.g., Enterprise Content Management (ECM) documents) by multiple software applications.

Some current systems implement a set of independent applications, where each of the applications issues separate queries to obtain and process candidate documents and where each of the applications manages the control functionality, such as distributed processing and restart-ability. Such current systems may result in 1) redundant and conflicting queries to obtain sets of documents, which commonly overlap, 2) conflicting updates, database deadlocks, and other concurrency issues due to non-isolated document processing by multiple simultaneous applications, 3) poor horizontal scaling of applications due to an improperly implemented or missing distributed processing control mechanism, 4) higher administration costs, and 5) reduced overall system reliability due to inconsistent implementation of the applications and separate control mechanisms.

SUMMARY

Provided is a computer-implemented method for a framework for continuous processing of a set of documents. The method comprises providing, using a processor of a computer, a framework having a scanning control for selecting a batch of documents using configuration data and a process control for processing the batch of documents. The method also comprises, under control of the framework, sending the batch of documents to a plurality of subscribed applications serially, wherein the batch of documents is selected based on a high key value stored in the configuration data, and wherein each of the subscribed applications subscribes with the framework to process a document type, and updating the stored high key value in the configuration data for use in selecting another batch of documents.

Provided is a computer program product for continuous processing of a set of documents. The computer program product comprising a computer readable storage medium having program code embodied therewith, the program code executable by at least one processor to perform: providing, by the at least one processor, a framework having a scanning control for selecting a batch of documents using configuration data and a process control for processing the batch of documents; and, under control of the framework, sending the batch of documents to a plurality of subscribed applications serially, wherein the batch of documents is selected based on a high key value stored in the configuration data, and wherein each of the subscribed applications subscribes with the framework to process a document type; and updating the stored high key value in the configuration data for use in selecting another batch of documents.

Provided is a computer system for continuous processing of a set of documents. The computer system, comprising: one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform: providing a framework having a scanning control for selecting a batch of documents using configuration data and a process control for processing the batch of documents; and, under control of the framework, sending the batch of documents to a plurality of subscribed applications serially, wherein the batch of documents is selected based on a high key value stored in the configuration data, and wherein each of the subscribed applications subscribes with the framework to process a document type, and updating the stored high key value in the configuration data for use in selecting another batch of documents.

BRIEF DESCRIPTION OF THE SEVERAL VIEWS OF THE DRAWINGS

Referring now to the drawings in which like reference numbers represent corresponding parts throughout.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
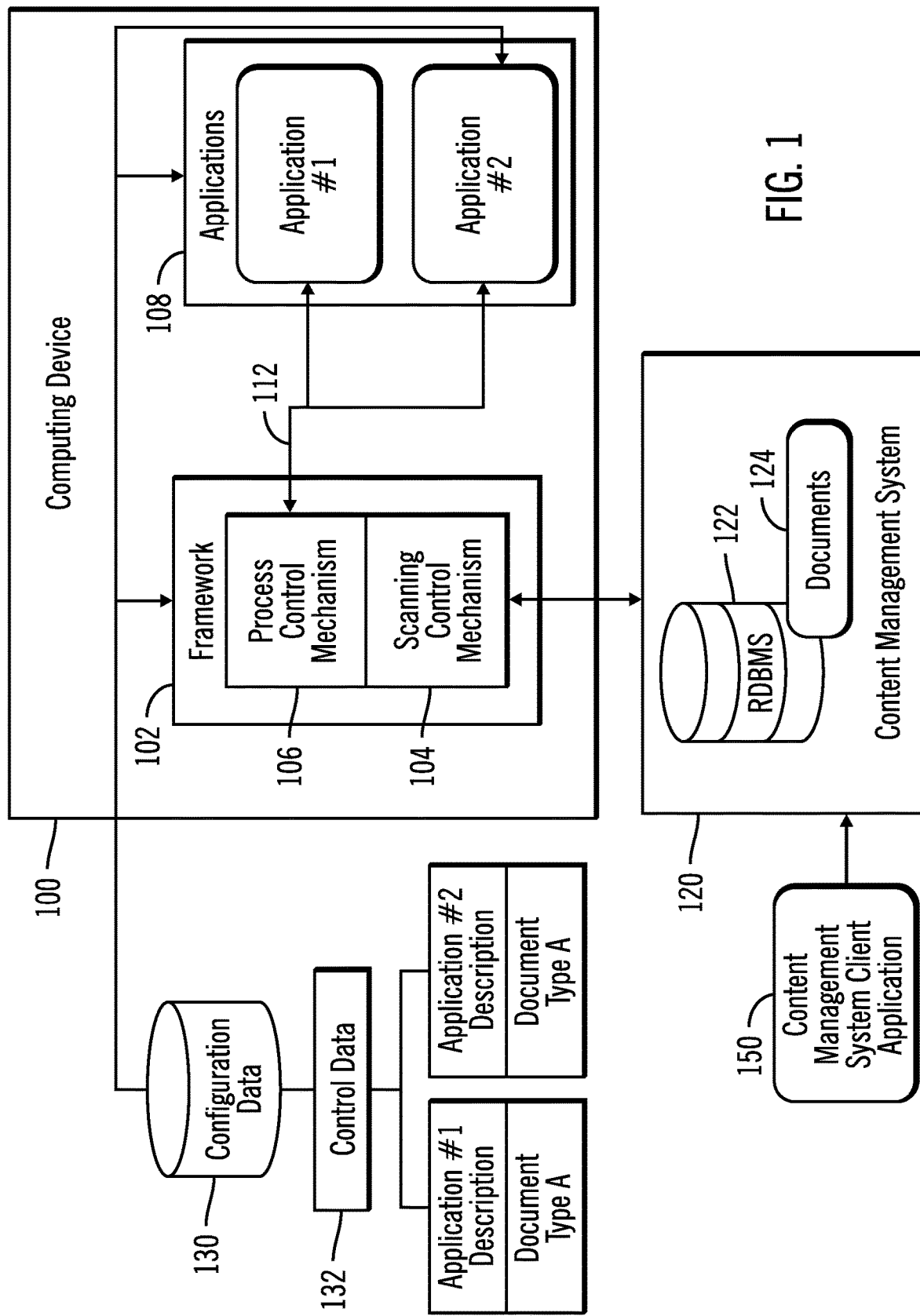
FIG. 1 illustrates, in a block diagram, a computing environment in accordance with certain embodiments.

FIG. 1 illustrates, in a block diagram, a computing environment in accordance with certain embodiments. The computing environment includes a computing device 100 (e.g., a server) and a content management system 120. The computing device 100 includes a core processing framework 102 (referred to as "framework" herein), one or more sets of configuration data 130, one or more applications 108, and an interface 112 between the framework 102 and the applications 108. The framework 102 includes a scanning control mechanism 104 and a process control mechanism 106. The content management system 120 may be based on a Relational Database Management System (RDBMS) 122, which hosts a table that contains the documents 124 (e.g., document objects), which consist of metadata and content (the content may be stored independent of the metadata). A content management system client application 150 issues queries to the content management system 120. The applications 108 may be multiple, independently developed applications. Also, the applications 108 may be described as "subscribing" applications 108 because the applications 108 subscribe to the framework for the processing of a document type or a document type plus one or more sub-types of the document type. The configuration data 130 includes control data 132, such as an application #1 description with a document type of A and an application #2 description with a document type of A.

A document type may be specified by an administrator or other user. For example, a document type may be "loan form", and sub-types of that document type may be "home loan form", "auto loan form", and "boat loan form". An example of a non-related document type may be a document that is not a loan form, such as a form for obtaining a safety deposit box.

In certain embodiments, the applications 108 are not requesting the batches, instead the batches are being obtained by the scanning control mechanism 104, and then passed to the applications 108. The applications 108 process the documents (e.g., forward the documents, delete the documents over 5 years old, etc.).

The framework 102 (e.g., a software framework) enables managing the processing of a set of Enterprise Content Management (ECM) documents by the applications 108. The scanning control mechanism 104 of the framework 102 coordinates obtaining ordered groups of documents from the data set across one or more computers in a distributed and restart-able way, applying filters described by configuration data 130 to the documents to determine whether they are candidates for processing, passing sets of candidates to one or more of the applications 108, and recording results returned from the one or more applications 108.

The framework 102 drives the processing of documents by a group of the applications 108. In certain embodiments, it may be said that the framework consists of the scanning control mechanism 104, the process control mechanism 106, a reference to a set of documents 124, configuration data 130 used by both the framework 102 and the applications 108, and an interface definition (for interface 112) between the framework 102 and the applications 108. The applications are driven by the framework 102 and may each be an independent implementation of a series of business rules that operate on the set of documents 124.

With embodiments, the framework 102 provides the applications 108 with efficient distributed processing and a consistent and reliable implementation by: 1) eliminating redundant and conflicting queries when obtaining sets of documents, 2) providing isolated processing of individual documents across a distributed environment, 3) providing horizontal scaling and high availability in a distributed environment, 4) providing a consistent control mechanism and configuration data across all applications, and 5) providing an extensible/pluggable model into which custom actions can be applied against the set of documents 124 being processed.

With embodiments, the framework 102 eliminates redundant and conflicting queries of the content management system 120 by allowing a single thread of execution across the distributed environment to sequentially obtain documents 124 from the data set. For example, given a distributed environment of three computers, A, B, and C, all running framework instances of the framework 102, the framework instance on A obtains the first batch of documents 124 while blocking computers B and C from obtaining documents 124. In certain embodiments, the framework instance does not block processing of documents 124 previously obtained on any computer, but the framework instance blocks other computers from obtaining documents 124. Then, the framework instance on computer B obtains the next batch of documents 124, while blocking computers A and C. Using this technique, the framework 102 instances provide distributed processing, while avoiding conflicting queries.

In addition, the framework 102 supports isolated processing of individual documents 124 by leveraging the mechanism that avoids conflicting queries. Given that each batch of documents 124 is obtained sequentially and in isolation, the framework 102 avoids simultaneous processing of documents by controlling how the documents 124 are passed to each application. For example, given three applications, the framework 102 first passes a batch of documents 124 to application #1, then to application #2, and finally to application #3. At no time is the batch of documents being simultaneously processed by multiple applications 108, and this avoids conflicting document updates and other concurrency issues.

Moreover, the framework 102 provides horizontal scaling and high availability via its ability to run concurrently on multiple computers in a distributed environment, with many instances of many different applications 108 running concurrently. The framework 102 supports this distributed environment, while providing processing of individual documents 124 in isolation, and, in addition, avoids redundant and conflicting queries when processing the data set. High availability is achieved by running the framework 102 concurrently on multiple computers. If one or more computers are taken offline, the framework 102 continues processing on the remaining online computers.

Furthermore, the framework 102 provides an implementation of a single process control mechanism 106 and provides configuration data 130 that leads to lower system administrative costs. Thus, the extensible/pluggable model leads to lower software development and maintenance costs.

The framework 102 may be described as an automated electronic processing framework that provides applications 108 with a mechanism for continuous processing of a set of digitally stored documents that are related to an Enterprise Content Management system. In certain embodiments, a document 124 consists of metadata and optional content, and each document 124 in the set has a unique and orderable key value or key values. In certain embodiments, each document 124 is assigned the key value or key values.

The scanning control mechanism 104 drives the applications 108 by obtaining candidate documents 124 from the data set, and passing the candidate documents 124 to multiple applications 108 for processing. The scanning control mechanism coordinates obtaining ordered groups of documents 124 from the data set across multiple computers in a distributed and restart-able way, optionally, applying filters described by the configuration data 130 to the documents 124 to determine whether they are candidates for processing.

The process control mechanism 106 is responsible for starting and monitoring application instances (for the applications 108), passing sets of candidate documents 124 to the applications 108, and passing results returned from the applications 108 back to the scanning control mechanism 104, which records the results. In order to provide the scanning control mechanism 104 with a means of ordering and processing the data set, the metadata of the documents may be hosted by the RDBMS 122, although the scanning control mechanism 104 may be applied to a set of documents 124 stored in some other digital form.

The configuration data 130 controls the operation of the framework 102 and the applications 108, and is application instance specific (i.e., each instance of an application may use distinct configuration data 130). The configuration data 130 describes framework and application behavior and consists of two parts. The first part is data set centric and used by the framework 102 to determine which documents 124 from the data set are candidate documents 124 for processing by which applications. The second part is application centric, and consists of parameters that are used by an application 108 to determine how the business rules implemented by the application 108 should be applied to the candidate documents 124.

The interface 112 defines the communications layer between the framework 102 and the application 108. The interface 112 between the framework 102 and the application 108 may be implemented as a set of in-process method calls. In other embodiments, other mechanisms, such as remote procedure calls, may be implemented. The interface 112 defines how documents 124 from the data set are passed from the scanning control mechanism 104 to the application 108 and defines the details of how the application 108 responds to the framework 102.

In certain embodiments, each application 108 is related to a single type of document 124, and a document type may include multiple related document sub-types. An application 108 is implemented to process that document type or that document type plus one or more sub-types of the document type and expects the framework 102 to pass documents of those types and/or sub-types to the application 108. In certain embodiments, the relationship between an application 108 and a document type is that there may be one document type to many applications. The definition of the relationship is contained in the configuration data 130 of the application 108. In certain embodiments, an application subscribes to one or more document types and/or sub-types.

Applications 108 that are related to the same document type are considered to be an application set. For example, application #1 and application #2 are in the same application set if they are both related to document type A. The framework processing is based on the defined application sets. For each application set, each instance of the framework 102 provides a separate set of the scanning control mechanism instances and process control instances. Documents 124 of a given type are obtained by the scanning control mechanism 104 and then passed to all related (subscribed) applications 108 by the process control mechanism 106. A single scanning pass over the documents 124 is leveraged by applications related to the document type, and, during the scanning pass, the appropriate documents 160 are passed to the appropriate applications 108.

The scanning control mechanism 104 obtains multiple documents 124 of a given type from the content management system 120 and combines the documents 124 into a batch of documents 124. Filtering of documents 124 is the process of reducing the batch of documents 124 to the documents 124 of interest to a given application 108. Filtering uses a filter expression, which is defined for each application 108 in the configuration data 130. The filter expression may be applied by the scanning control mechanism 104, the process control mechanism 106, the application 108, or any combination of these three.

There are many possible techniques for implementing the filter expression. Certain embodiments mimic a subset of the syntax and behavior of the Structured Query Language (SQL) WHERE clause. For example, assume that a document type contains a property named 'Site', and that application #1 processes documents from the London or Paris sites, and that application #2 processes documents from the Chicago site. In this example, the filter expressions for the applications would be defined as seen below.

Application #1: Site='London' OR Site='Paris'
Application #2: Site='Chicago'

If filtering is applied by the scanning control mechanism 104, then a query feature of the content management system 120 may be leveraged to aid in applying the filter expression to the documents 124. The filter expressions may first be translated into a syntax understood by the content management system 120 and then passed to the content management system 120, which will obtain a set of documents 124 based on the translated filter expression. For example, given the two filter expressions above and a content management system 120 that supports a SQL-like syntax, the scanning control mechanism 104 may formulate the WHERE clause below and pass the WHERE clause to the content management system 120.

WHERE (Site='London' OR Site='Paris') OR (Site='Chicago')

In this example, the two filter expressions are combined using an OR operator, since the scan obtains all documents that are related to either application #1 or application #2. In the example, further filtering is required before the set of documents is processed by the applications 108, since the set contains documents 124 that do not apply to both applications 108. A second layer of filtering may be applied by either the process control mechanism 106 or by the application 108. If the second layer of filtering is implemented by the process control mechanism 106, each application specific filter expression is applied to reduce the batch of documents 124 prior to the batch of documents 124 being passed to the application 108. If the second layer of filtering is implemented by the application 108, the full batch of documents 124 is passed to the application 108, and the application 108 is responsible for reducing the batch of documents 124 using the filter expression.

Figure 2:
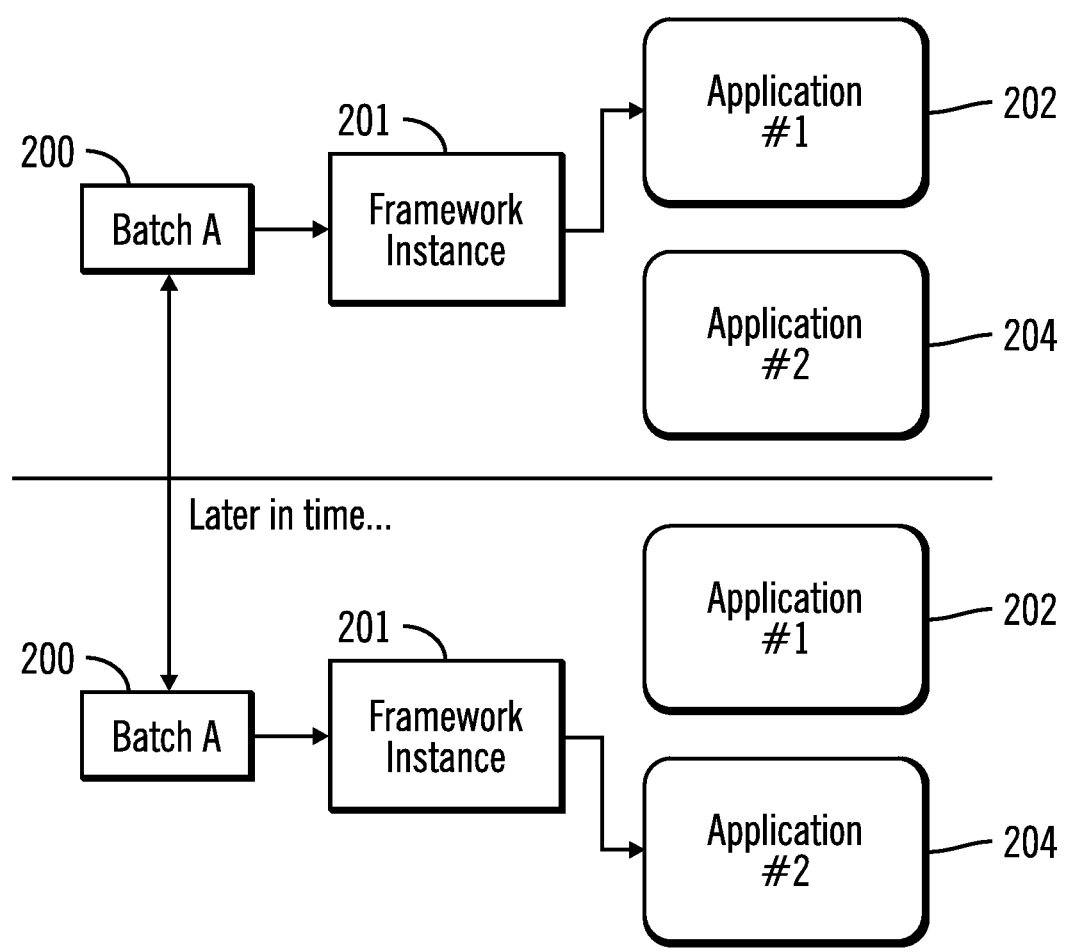
FIG. 2 illustrates isolated processing in accordance with certain embodiments.

FIG. 2 illustrates isolated processing in accordance with certain embodiments. A batch of documents 124 is not processed simultaneously by multiple application instances, and this provides for isolated processing of each document 124. In FIG. 2, a batch of documents 200 is passed by the framework instance 201 to application #1 202. The batch of documents 200 is not passed to any other application instance while it is being processed by application #1 202. Later in time, after application #1 202 has completed processing of the batch of documents 200, the batch of documents 200 is passed by the framework instance 201 to application #2 204. If for some reason the framework instance 201 was shutdown (e.g., failed, etc.), the batch of documents 200 would be re-processed by the applications 202, 204, since the status is not recorded until the batch of documents 201 is fully processed).

Figure 3:
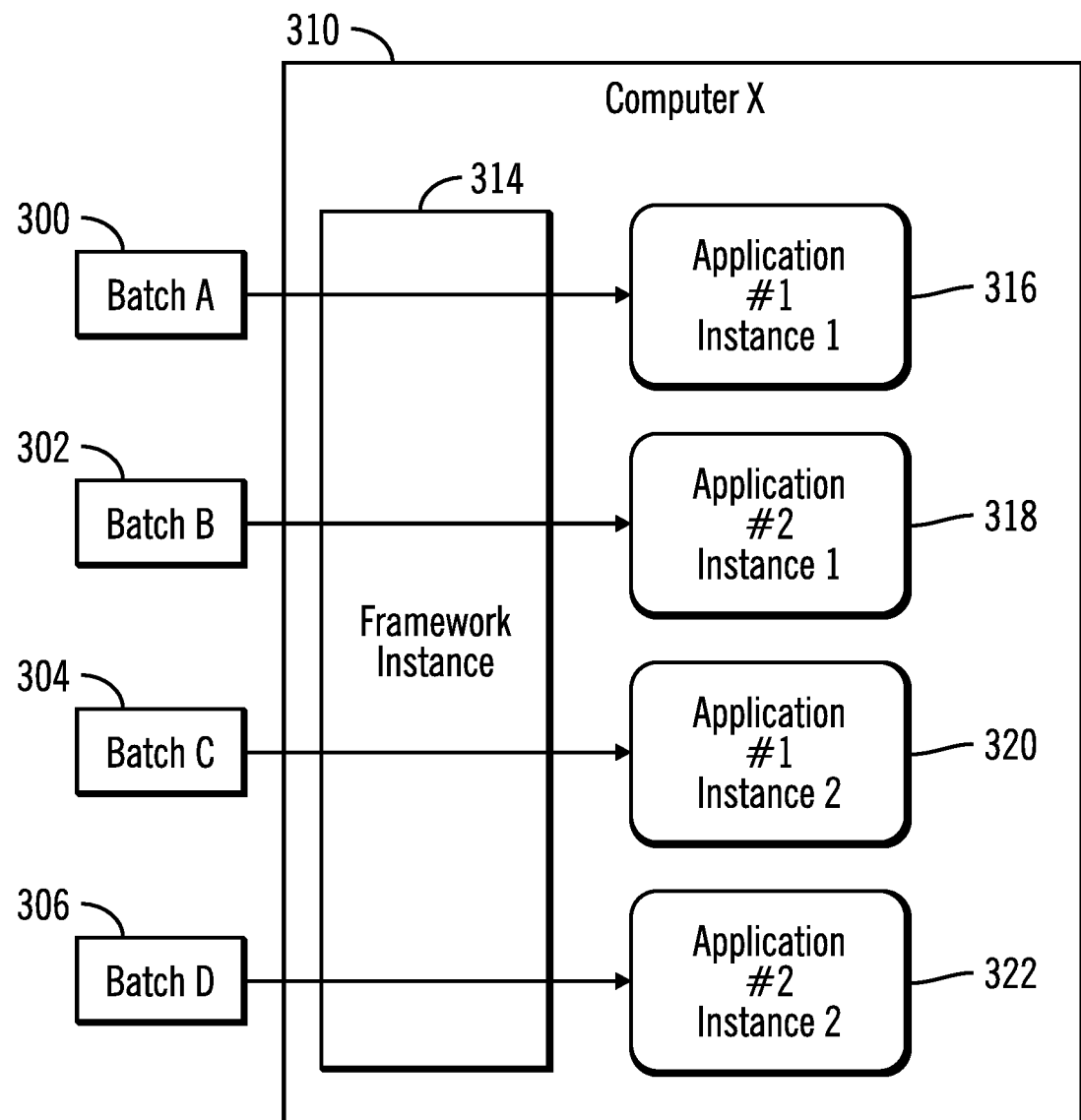
FIG. 3 illustrates logical, simultaneous processing in accordance with certain embodiments.

FIG. 3 illustrates logical, simultaneous processing in accordance with certain embodiments. Concurrency is achieved by having multiple instances of the applications 108 simultaneously process separate batches of documents 124. In the example of FIG. 3, there are four batches of documents, A 300, B 302, C 304, and D 306, there are two instances of each of two applications, application #1 instance 1 316, application #2 instance 1 318, application #1 instance 2 320, and application #2 instance 2 320. The framework instance 314 of computer X 310 controls the application instances 316, 318, 320, 322, and simultaneously passes a separate batch of documents to each application instance 316, 318, 320, 322, allowing for concurrent processing of separate documents.

Figure 4:
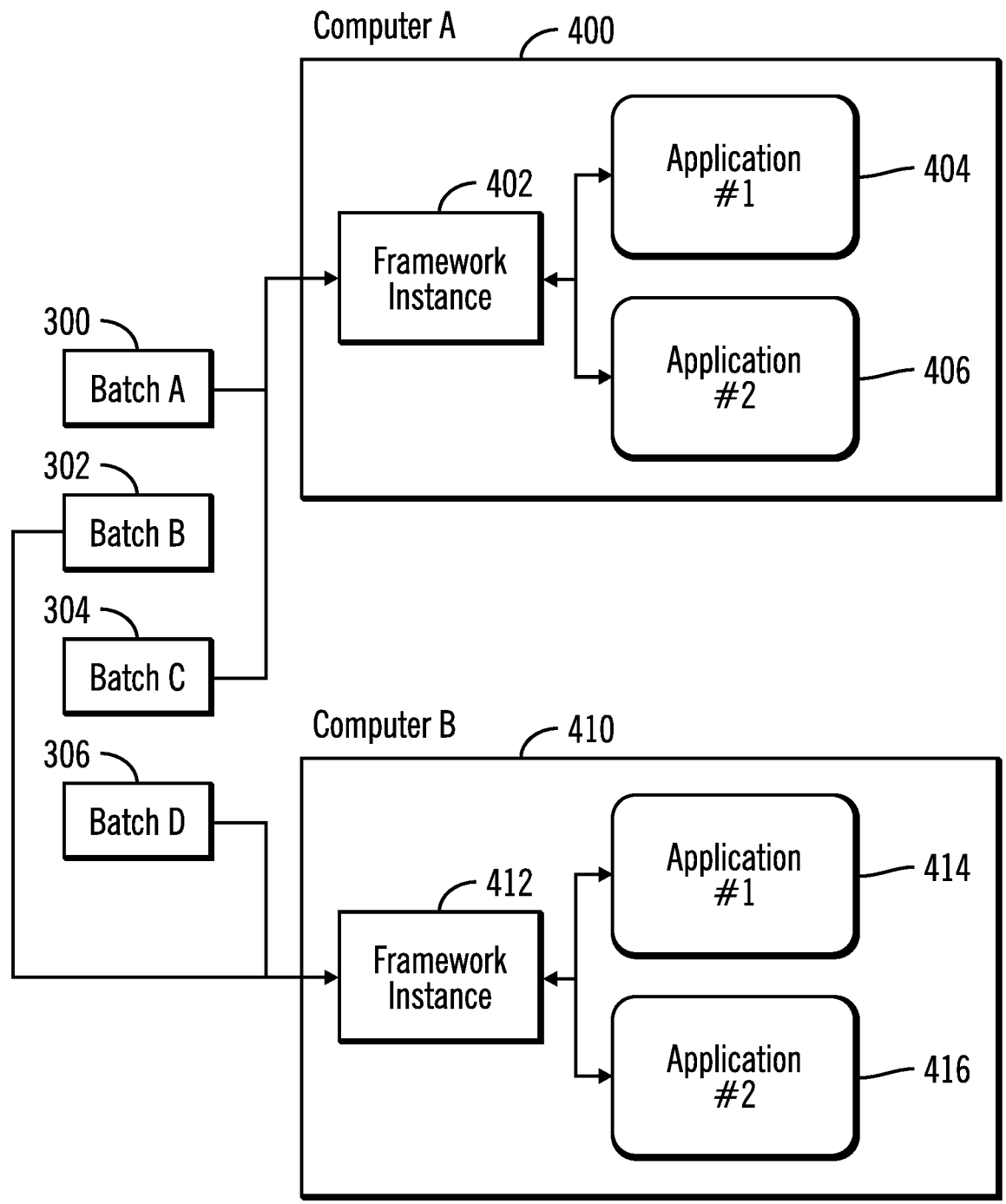
FIG. 4 illustrates distributed processing in accordance with certain embodiments.

The framework 102 provides distributed processing and high availability through collaborative execution on multiple computers. FIG. 4 illustrates distributed processing in accordance with certain embodiments. Given four batches of documents A 300, B 302, C 304, and D 306, and two instances of the framework 402, 412, with framework instance 402 on computer A 400 and framework instance 412 on computer B 410, the collaborating framework instances 402, 412 obtain and process separate batches of documents. In the example, the framework instance 402 on computer A 400 obtains batch A 300 and batch C 304, while the framework instance 412 on computer B 410 obtains batch B 302 and batch D 304. The framework instance 402 on computer A 400 passes batches A 300 and C 304 to application instance #1 404 and application instance #2 406, and the framework instance 412 on computer B 410 passes batches B 302 and D 304 to application instance #1 414 and application instance #2 416, using the concurrency model illustrated in FIG. 2.

This distribution scheme also provides high availability in that independent framework instances continue processing after other framework instances terminate. For example, if computer B failed before processing batches B and D, computer A would continue processing of batches A and C. The documents contained in batches B and D would not be processed during the current pass over the document set, but would be candidates for processing during the next pass over the document set.

Figure 5:
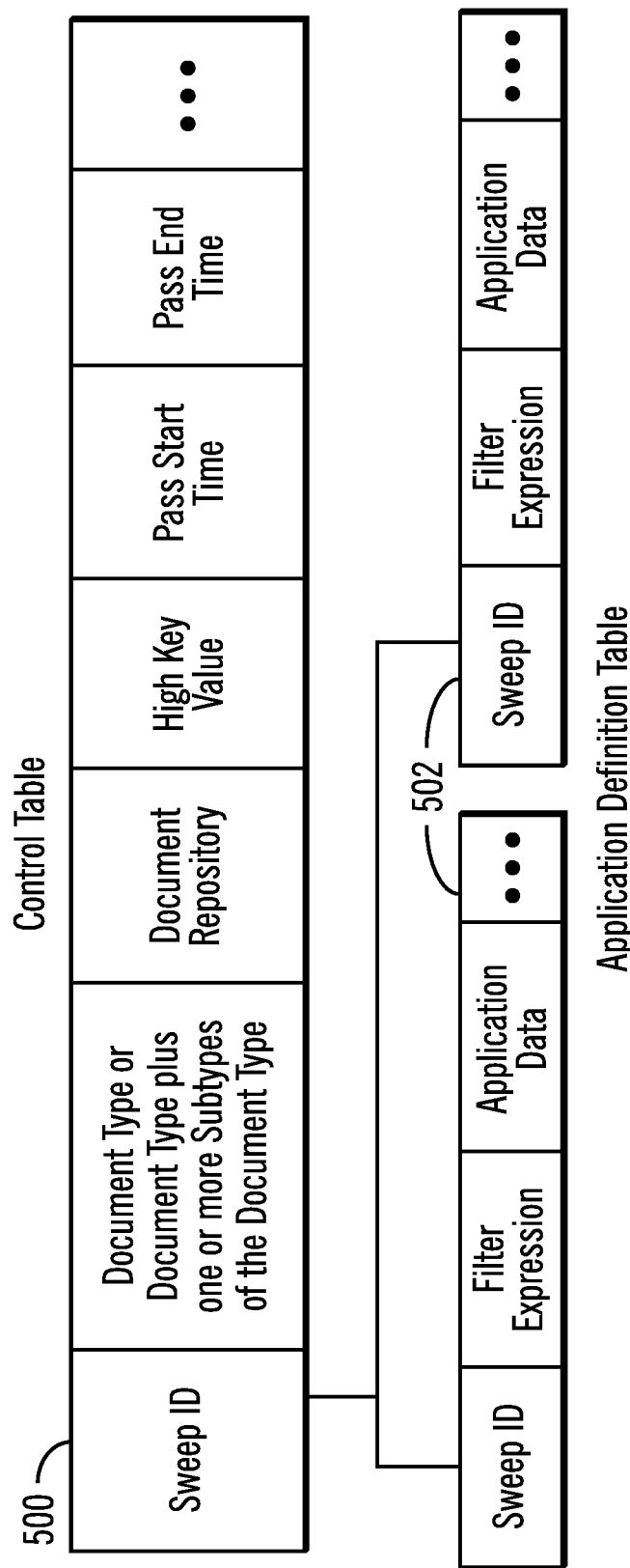
FIG. 5 illustrates an example of configuration data in accordance with certain embodiments.

The framework 102 uses a set of configuration data 130 that may be stored in the RDBMS 122. FIG. 5 illustrates an example of configuration data in accordance with certain embodiments. The configuration data is illustrated using a control table 500 and an application definition table 502. Each row of the control table 500 may be referred to as a control row. The control table 500 defines a sweep, which is defined by 1) a document type or by a document type plus one or more sub-types of the document type and 2) a set of subscribed applications. A sweep may be described as a single pass of a data set (e.g., from lowest to highest or some other order). A sweep may be done periodically or may be initiated by a trigger (e.g., the control data changes because a new application has been added or state of a document has changed (e.g., the document is now 5 years old or is being stored in a different location)). The sweep is performed to push the documents 124 to the applications 108, and the applications 108 perform whatever processing that they are designed to perform on the received documents 124. Each control row of the control table 500 contains a unique sweep identifier, the document type or the document type plus one or more sub-types for the sweep, a reference to a document repository (e.g., the content management system 120), a high key value (which is a highest key value processed during a current pass (also referred to as a "sweep pass")), a pass start time, and a pass end time. The application definition table 502 contains the sweep, an application filter expression, and application data used by the application 108. For example, if an application 108 is designed to alter a property of a document 124, the application data might define the property to be altered and the new value to be assigned to the property. The control and application definition tables are related via the sweep identifier.

The scanning control mechanism 104 makes distinct, repetitive passes, or sweeps, over the document set, and a batch of documents for the document set is defined by the document type or by the document type plus one or more sub-types in the control data. Each pass begins with selection of a batch of documents ranging from a lowest key value (greater than a previous high key value) to a highest key value (e.g., from 1-100). During a pass, the content management system: 1) client applications 150 may add or delete documents 124, 2) the behavior of documents that are added or deleted during a pass may be undefined, and 3) any of the documents 124 may or may not be included in the pass.

Figure 6A:
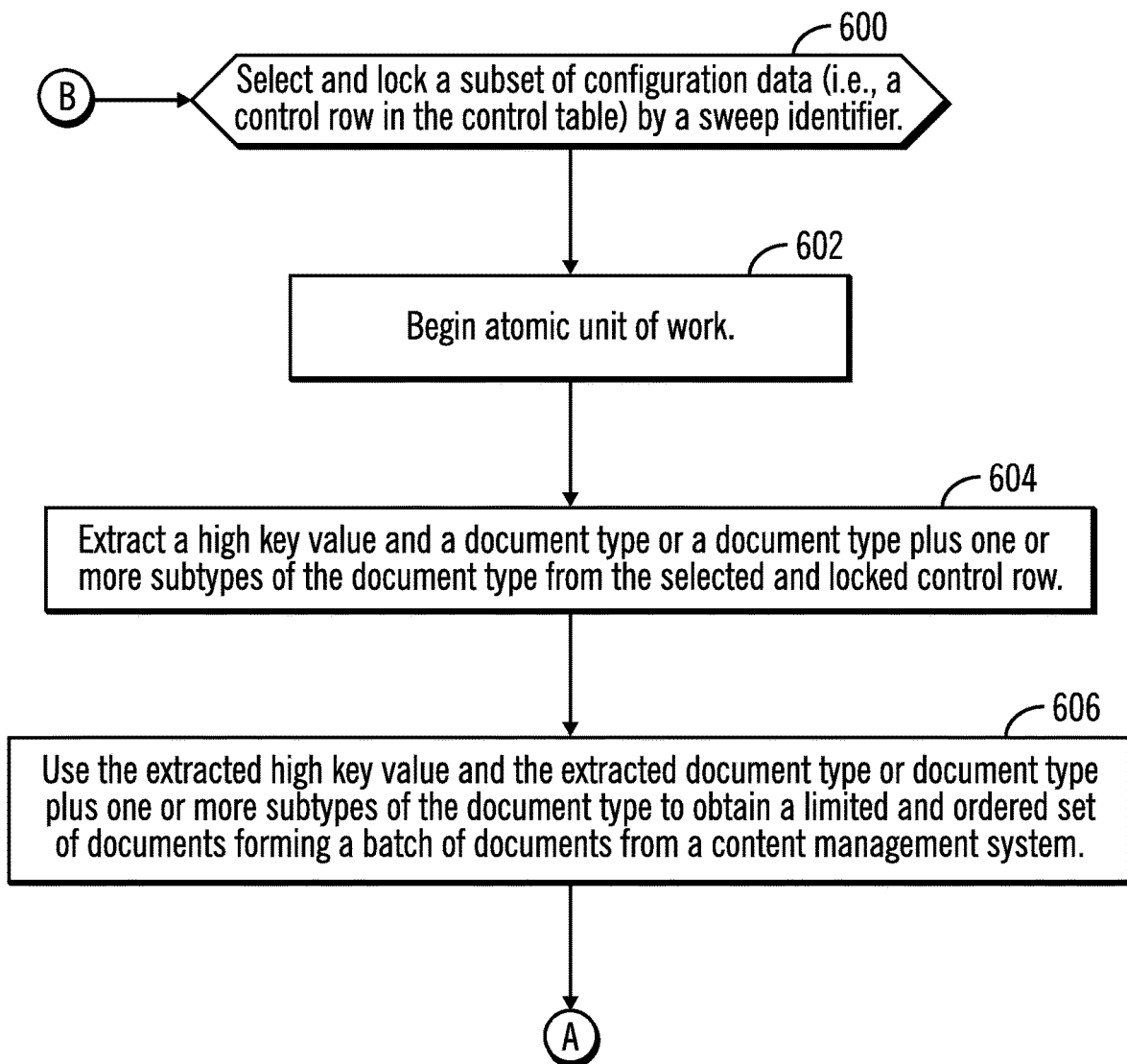
FIGS. 6A and 6B illustrate, in a flow diagram, operations performed by a scanning control mechanism for a sweep in accordance with certain embodiments.
Figure 6B:
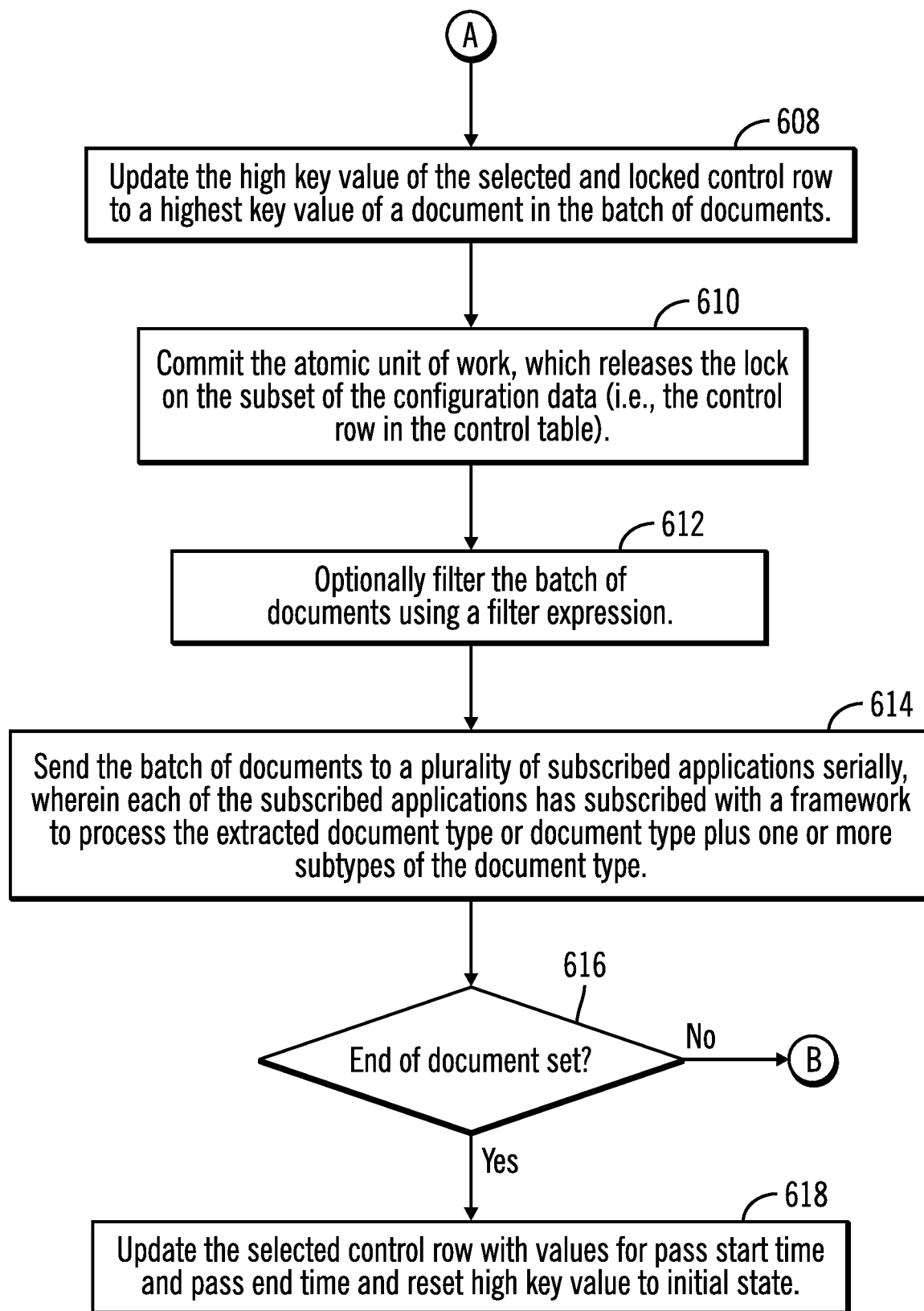

FIGS. 6A and 6B illustrate, in a flow diagram, operations performed by the scanning control mechanism 104 for a sweep in accordance with certain embodiments. The processing loop shown in FIGS. 6A and 6B is driven by the framework itself (e.g., the framework is responsible for making passes over the documents and does so by starting at the 'lowest' (order wise) document and progressing through all documents). FIGS. 6A and 6B illustrate a sweep of a document set managed by the content management system, and a batch of documents for the document set may be selected by a filter. Control begins at block 600 with the scanning control mechanism 104 selecting and locking a subset of configuration data (i.e., a control row in the control table) by a sweep identifier. The technique used to lock the control row may be different in different embodiments and may depend on the underlying RDBMS 122 which supports the ability to exclusively lock a control row for the duration of a transaction.

In block 602, the scanning control mechanism 104 begins an atomic unit of work (e.g., a transaction). The atomic unit of work creates an exclusive boundary around the processing of blocks 604-610 and indicates that the processing of these blocks must be completed fully or not at all.

In block 604, the scanning control mechanism 104 extracts a high key value and a document type or a document type plus one or more sub-types of the document type from the selected and locked control row. In certain embodiments, the key values are integer values (e.g., 1, 2, 3 . . . ), and the high key value is initially set to zero (so that documents having a key value higher than zero are selected). In block 606, the scanning control mechanism 104 uses the extracted high key value and the extracted document type or document type plus one or more sub-types of the document type to obtain a limited and ordered (e.g., based on key values) set of documents forming a batch of documents from the content management system 120. From block 606 (FIG. 6A), processing continues to block 608 (FIG. 6B).

For example, the scanning control mechanism 104 may issue the following query to obtain a batch of documents:

SELECT n rows from document set
WHERE key value>previous high key value AND document type=loan
ORDER BY key value Thus, if "n" is set to 100, and the previous high key value is "0" (zero), then, initially, 100 documents having key values greater than zero and having a document type of "loan" are selected. That is, "n" documents having key values greater than the previous high key value are selected.

In block 608, the scanning control mechanism 104 updates the high key value of the selected and locked control row to a highest key value of a document in the batch of documents. For example, if document having key values of 1-100 were included in the batch of documents, then the highest key value is 100.

In block 610, the scanning control mechanism 104 commits the atomic unit of work (e.g., a transaction), which releases the lock on the subset of the configuration data (i.e., the control row in the control table).

In block 612, the batch of documents is optionally filtered using a filter expression. Applying the filter expression results in a filtered batch of documents. The filter expression may be applied by the scanning control mechanism 104, the process control mechanism 106, an application 108, or any combination of these three.

In block 614, the scanning control mechanism 104 sends the batch of documents to a plurality of subscribed applications 108 serially, wherein each of the subscribed applications 108 has subscribed with the framework 102 to process the extracted document type or document type plus one or more sub-types of the document type. In certain embodiments, the scanning control mechanism 104 sends the batch of documents to the applications 108 via the process control mechanism 106. That is, in certain embodiments, the scanning control mechanism 104 passes the batch of documents to the process control mechanism 106, which in turn passes the batch of documents to an application 108. In block 616, the scanning control mechanism 104 determines whether the end of the document set has been reached. If so, processing continues to block 618, otherwise, processing continues to block 600 (FIG. 6A). In block 618, the scanning control mechanism 104 updates the control row with values for pass start time and pass end time and resets the high key value to an initial state. In certain embodiments, the initial state is prior to 600 (e.g., a highest key value contained in the control data that is at or below the lowest possible key value). At this time, the sweep is considered to have been completed, the next sweep will begin with the lowest key value.

The scanning control mechanism 104 allows a single, concurrent scanning instance for a given control row to be in the process of obtaining documents. This provides for distributed and isolated processing in that each scanning instance waits on the control lock, and then obtains the next unique set of documents. Processing of the documents is not blocked when the scanning control mechanism is waiting on the control row lock, and processing is driven by the process control mechanism 106 and continues on separate threads of execution, independent of the scanning control mechanism 104.

Restart-ability and high availability is achieved through the highest key value maintained in the control table. Each framework instance uses the current highest key value to obtain the next set of ordered documents. This allows processing to be distributed across any number of framework instances, and allows a pass of a sweep to be restarted from the last highest key value, if all framework instances are temporarily stopped.

Given that the last highest key value is updated before the document set has been processed, not all documents selected are guaranteed to be processed during a pass. For example, if a set of documents is selected by the framework on computer A, and computer A fails after the last highest key value has been updated, but before the document set has been processed, the documents in the set will not be processed during the current pass.

When the highest value in a document set is selected, the processing pass is considered to have been completed. The control row is reset to an initial state to allow the next continuous pass to begin from the lowest key value. Starting the next pass immediately may not be desirable, and, in that case the framework may implement an inter pass delay, which prevents the next pass from starting until sometime after the previous pass completes.

Figure 7:
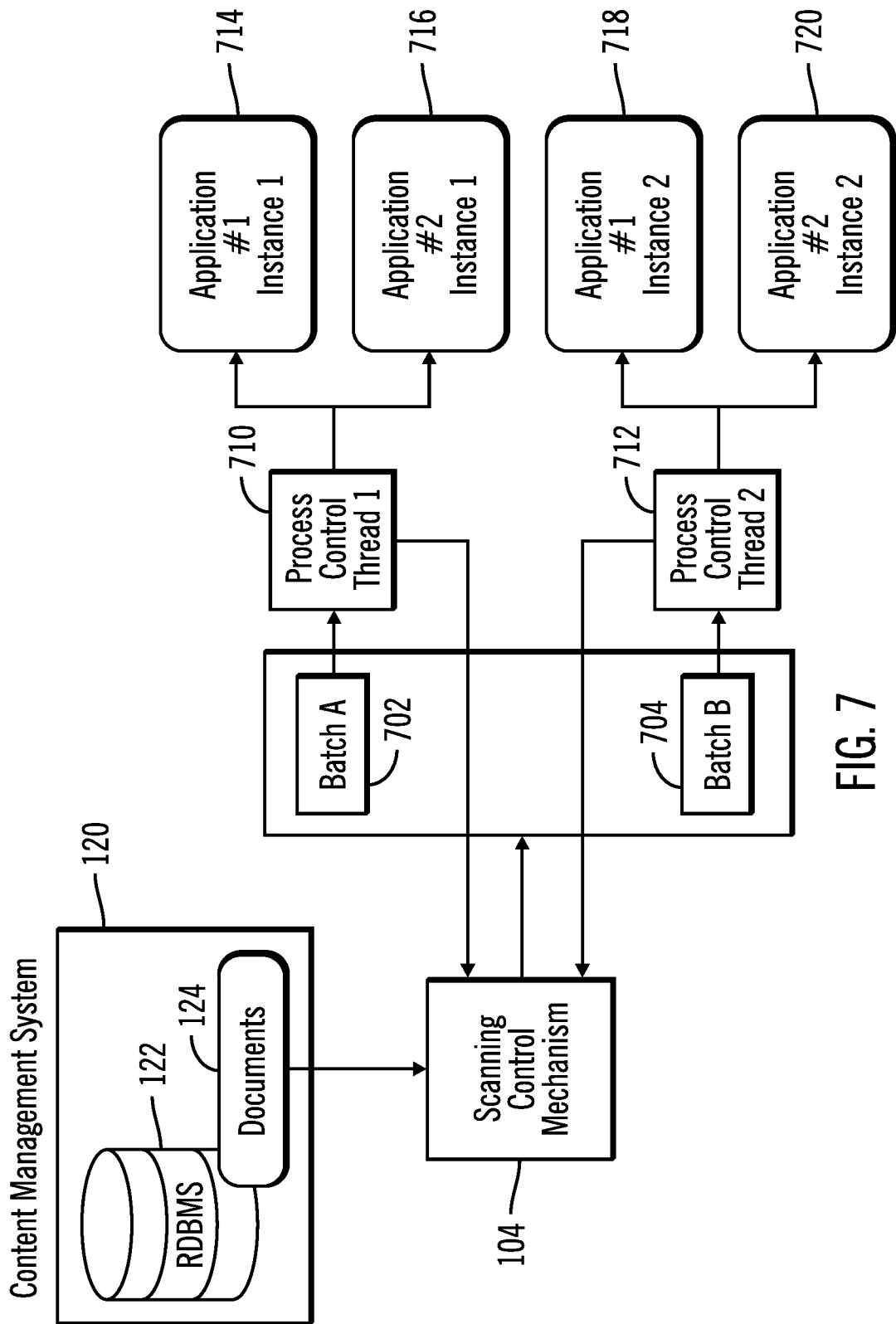
FIG. 7 illustrates operations performed by a process control mechanism in accordance with certain embodiments.

The process control mechanism 106 provides threads of execution for the subscribed applications 108, and manages passing batches of documents 124 to application instances. FIG. 7 illustrates operations performed by the process control mechanism 106 in accordance with certain embodiments. In the example of FIG. 7, the scanning control mechanism 104 obtains batches of documents 702 and 704 from the content management system 120 and makes the batches of documents available to the process control mechanism 106. The scanning control mechanism 104 then starts process control threads 710, 712 for instances of the process control mechanism 106.

The process control mechanism 106 creates instances of the applications 108, and passes batches of documents 124 to the applications 108. In certain embodiments, it is assumed that the applications 108 run within the same execution context as the framework 102 and that, if an external execution context is required by the application 108, it is the responsibility of the application 108 to initiate and communicate with the external execution context.

Continuing with the example of FIG. 7, process control thread 1 710 passes batch A 702 first to application 1 instance 1 714, then to application 2 instance 1 716. Process control thread 2 712 passes batch B 704 first to application 1 instance 2 718, then to application 2 instance 2 720. Note that this logic is similar to what is shown in FIG. 3, but FIG. 3 is a logical illustration of the concurrency model, where FIG. 7 represents the implementation of the process control mechanism 106.

Applications 714, 716, 718, 720 return per-document status information to the instances 710, 712 of the process control mechanism, which relays the information to the scanning control mechanism 104. For example, an application can return a status value that indicates whether a document was a) successfully processed, b) failed during processing, or c) was ignored due to the filter expression or for some other condition. The status information is used by the scanning control mechanism 104 to record summary and detailed results.

The number of concurrent process control threads may be configurable and stored within the sweep control row in the configuration data. The framework 102 monitors the number of active process control threads, and may pause the scanning control mechanism 104 when all process control threads are busy.

Figure 8:
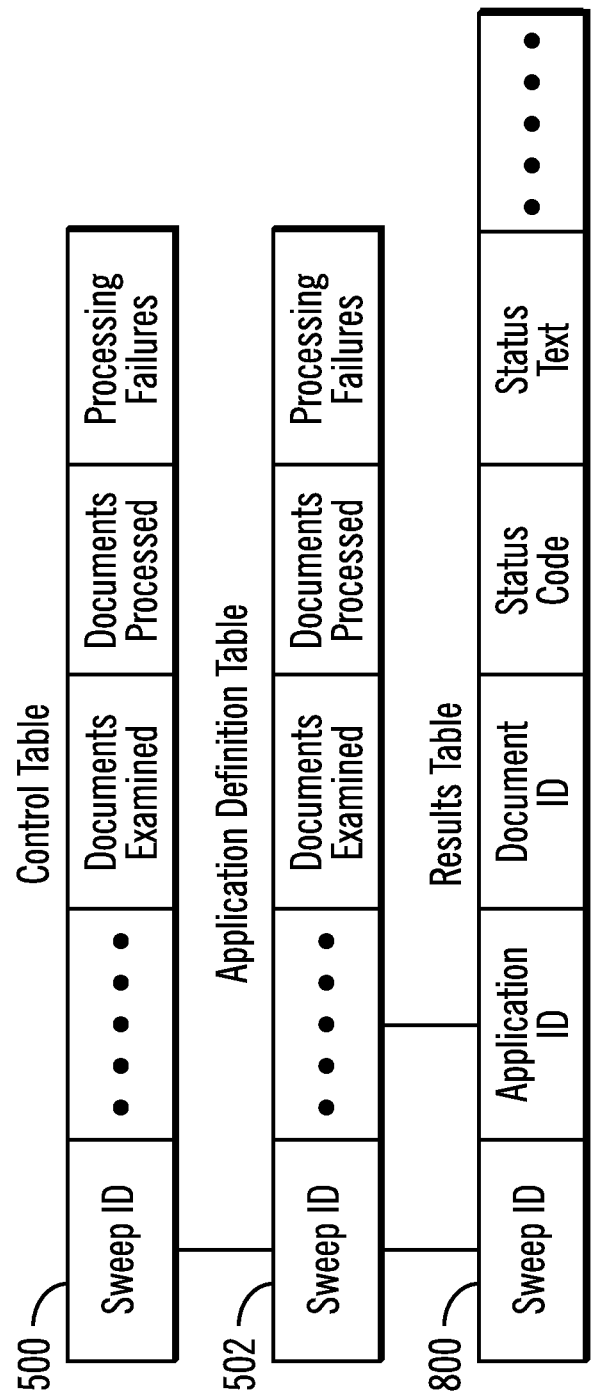
FIG. 8 illustrates result values recorded by a framework in accordance with certain embodiments.

The framework 102 records processing results based on status information returned by the applications 108. FIG. 8 illustrates result values recorded by the framework 102 in accordance with certain embodiments. FIG. 8 illustrates additional fields of the control table 500 and of the application definition table 502. The ellipses in the control table 500 represent fields of the control table 500 shown in FIG. 5 and not explicitly shown in FIG. 8. Within the control table 500, the framework 102 records a number of documents examined, a number of documents successfully processed, and a number of document processing failures. The accumulated results recorded in the control table 500 are a rollup of the results from all applications 108. Accumulated results for individual applications 108 are also recorded by the framework 102, within the application definition table 502. The ellipses of the application definition table 502 represent fields of the application definition table 502 shown in FIG. 5 and not shown explicitly in FIG. 8. The number of documents examined, the number of documents successfully processed, and the number of document processing failures are recorded for each application 108.

The framework 102 optionally records detailed results by individual document 124 in the results table 800. Per document status code and status text values returned from an application 108 may be recorded by the framework 102. In certain embodiments, detailed information is recorded for failures, although detailed information may be recorded for successful operations also.

The framework 102 may operate in a preview mode, which allows the results to be updated as if the processing of each document 124 had occurred, but without any updates actually being applied to the documents 124. In preview mode, the scanning control mechanism 104 operates normally, passing batches of documents 124 to the process control mechanism 106 and recording the results. The process control mechanism 106 collaborates with the applications 108 to return to the scanning control mechanism 104 an approximation of the results of processing the documents 124, without actually altering the documents 124. An approximation is returned since the outcome cannot always be correctly determined without actually performing the operation on a document 124.

Preview mode may operate in either summary mode or detailed mode. In summary mode, the counter values (e.g., a number of documents examined, a number of documents successfully processed, and a number of document processing failures) are updated. In detailed mode, the results table is populated with an entry for each document 124 selected by the scanning control mechanism 104, with the approximated results recorded for each document 124.

Thus, embodiments provide a framework that may be implemented with existing technology that may be used to build both process control and scanning control mechanisms. Embodiments provide a framework to provide applications operating on commonly overlapping sets of documents with efficient distributed processing by eliminating concurrency issues, eliminating redundant queries, and defining clear processing control. In certain embodiments, overlapping indicates that some or all of the documents in the set of documents may be processed by different applications. That is, each of the applications will process the set of documents, but each of the applications may not process all of the documents in the set of documents. In certain embodiments, the order in which the applications receive the set of documents is undefined.

Embodiments provide an interface for accessing documents according to a distributed framework utilizing one or more independent applications by providing an interface (front end) for accessing documents according to a distributed framework interfacing with the one or more independent applications, controlling access to the one or more independent applications according to the distributed framework (wherein the distributed framework allows scanning, process control, and configuration data providing information for interfacing with the one or more independent applications), and responsive to receiving a first request for data according to a first criteria and a second request for data according to a second criteria, automatically processing the first request and the second request in a manner to eliminate redundant queries and eliminate conflicting queries.

With embodiments, the one or more independent applications provide support for controlling ECM documents utilizing business rules. With embodiments, the distributed framework supports distributed processing, high availability, and restart-ability on at least two computing devices concurrently accessing the one or more independent applications. With embodiments, responsive to detecting a batch of documents requiring documents from more than one application in the one or more independent applications, requesting the batch of documents serially by receiving requests from a first application before requesting the batch of documents from a second application. With embodiments, the interface further provides an extensible [pluggable] model into which custom actions can be applied against the set of documents being processed. With embodiments, the interface defines a layer for communicating between the distributed framework and the one or more independent applications. With embodiments, each document has metadata that may be retrieved by a plurality of keys. Embodiments provide a relational database supporting queries for accessing the data of data.

Cloud Computing

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 9:
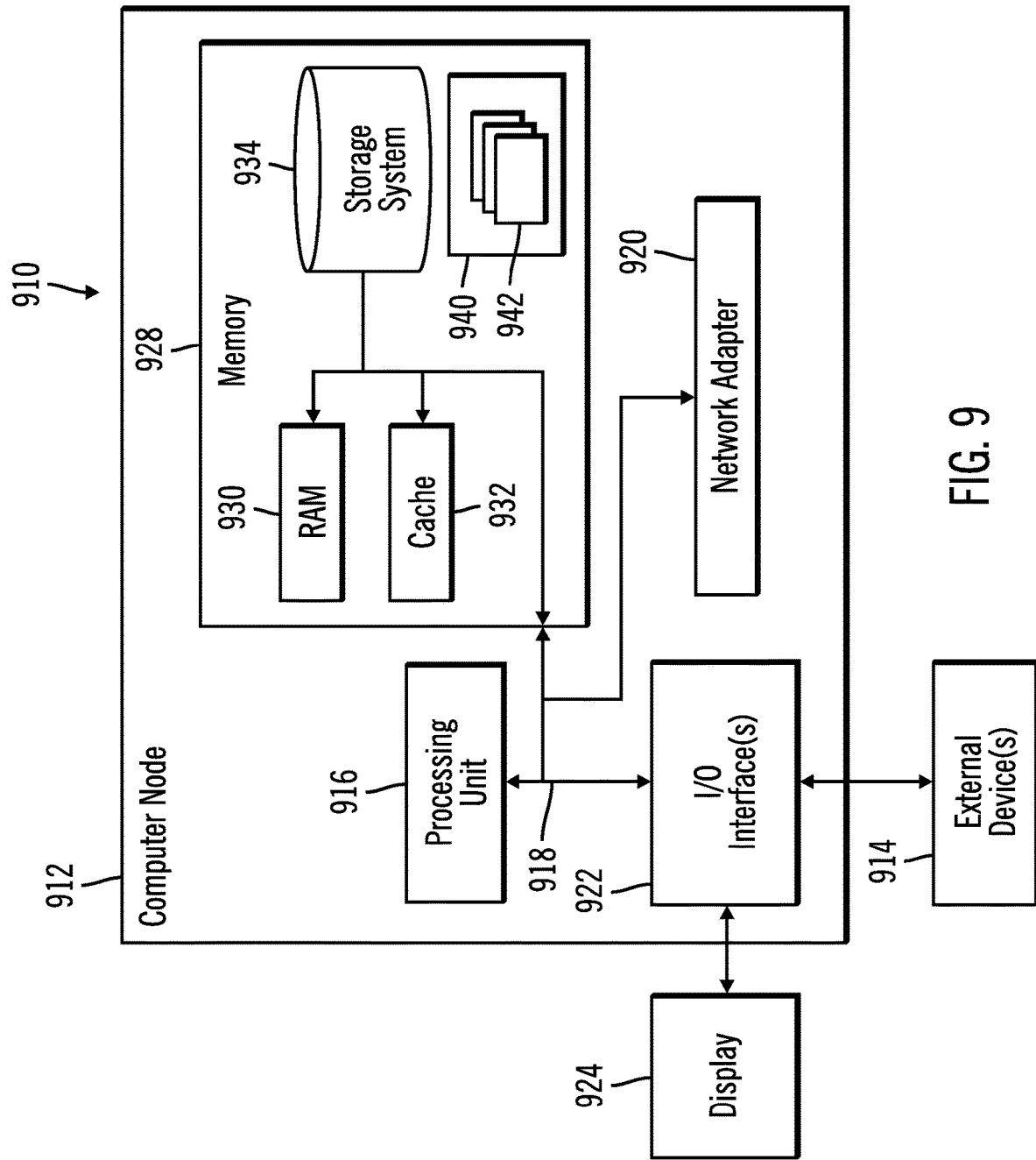
FIG. 9 depicts a cloud computing node in accordance with certain embodiments.

Referring now to FIG. 9, a schematic of an example of a cloud computing node is shown. Cloud computing node 910 is only one example of a suitable cloud computing node and is not intended to suggest any limitation as to the scope of use or functionality of embodiments of the invention described herein. Regardless, cloud computing node 910 is capable of being implemented and/or performing any of the functionality set forth hereinabove.

In cloud computing node 910 there is a computer system/server 912, which is operational with numerous other general purpose or special purpose computing system environments or configurations. Examples of well-known computing systems, environments, and/or configurations that may be suitable for use with computer system/server 912 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 912 may be described in the general context of computer system executable instructions, such as program modules, being executed by a computer system. Generally, program modules may include routines, programs, objects, components, logic, data structures, and so on that perform particular tasks or implement particular abstract data types. Computer system/server 912 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, computer system/server 912 in cloud computing node 910 is shown in the form of a general-purpose computing device. The components of computer system/server 912 may include, but are not limited to, one or more processors or processing units 916, a system memory 928, and a bus 918 that couples various system components including system memory 928 to processor 916.

Bus 918 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 912 typically includes a variety of computer system readable media. Such media may be any available media that is accessible by computer system/server 912, and it includes both volatile and non-volatile media, removable and non-removable media.

System memory 928 can include computer system readable media in the form of volatile memory, such as random access memory (RAM) 930 and/or cache memory 932. Computer system/server 912 may further include other removable/non-removable, volatile/non-volatile computer system storage media. By way of example only, storage system 934 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 918 by one or more data media interfaces. As will be further depicted and described below, memory 928 may include at least one program product having a set (e.g., at least one) of program modules that are configured to carry out the functions of embodiments of the invention.

Program/utility 940, having a set (at least one) of program modules 942, may be stored in memory 928 by way of example, and not limitation, as well as an operating system, one or more application programs, other program modules, and program data. Each of the operating system, one or more application programs, other program modules, and program data or some combination thereof, may include an implementation of a networking environment. Program modules 942 generally carry out the functions and/or methodologies of embodiments of the invention as described herein.

Computer system/server 912 may also communicate with one or more external devices 914 such as a keyboard, a pointing device, a display 924, etc.; one or more devices that enable a user to interact with computer system/server 912; and/or any devices (e.g., network card, modem, etc.) that enable computer system/server 912 to communicate with one or more other computing devices. Such communication can occur via Input/Output (I/O) interfaces 922. Still yet, computer system/server 912 can communicate with one or more networks such as a local area network (LAN), a general wide area network (WAN), and/or a public network (e.g., the Internet) via network adapter 920. As depicted, network adapter 920 communicates with the other components of computer system/server 912 via bus 918. It should be understood that although not shown, other hardware and/or software components could be used in conjunction with computer system/server 912. Examples, include, but are not limited to: microcode, device drivers, redundant processing units, external disk drive arrays, RAID systems, tape drives, and data archival storage systems, etc.

Figure 10:
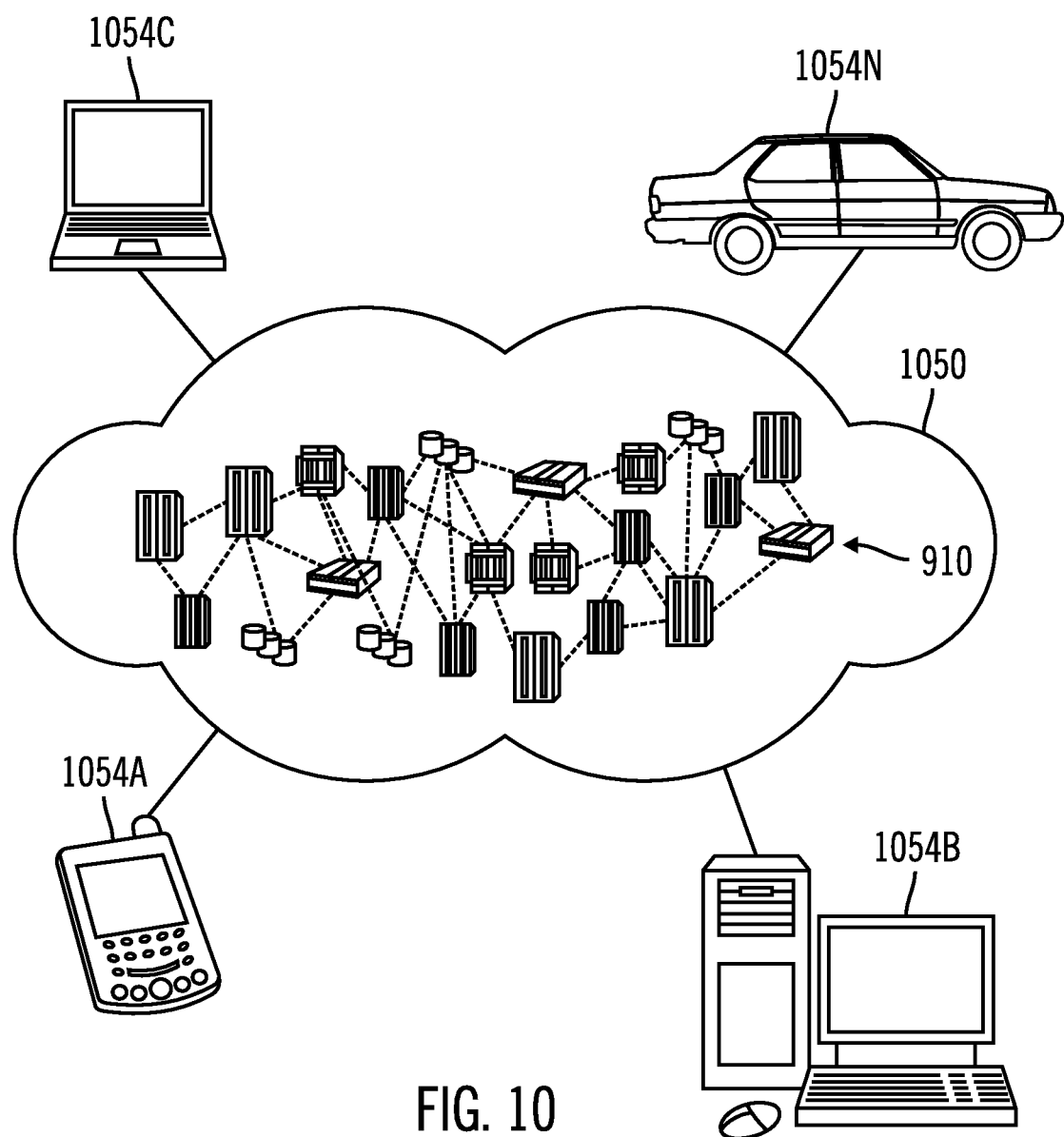
FIG. 10 depicts a cloud computing environment in accordance with certain embodiments.

Referring now to FIG. 10, illustrative cloud computing environment 1050 is depicted. As shown, cloud computing environment 1050 comprises one or more cloud computing nodes 910 with which local computing devices used by cloud consumers, such as, for example, personal digital assistant (PDA) or cellular telephone 1054A, desktop computer 1054B, laptop computer 1054C, and/or automobile computer system 1054N may communicate. Nodes 910 may communicate with one another. They may be grouped (not shown) physically or virtually, in one or more networks, such as Private, Community, Public, or Hybrid clouds as described hereinabove, or a combination thereof. This allows cloud computing environment 1050 to offer infrastructure, platforms and/or software as services for which a cloud consumer does not need to maintain resources on a local computing device. It is understood that the types of computing devices 1054A-N shown in FIG. 10 are intended to be illustrative only and that computing nodes 910 and cloud computing environment 1050 can communicate with any type of computerized device over any type of network and/or network addressable connection (e.g., using a web browser).

Figure 11:
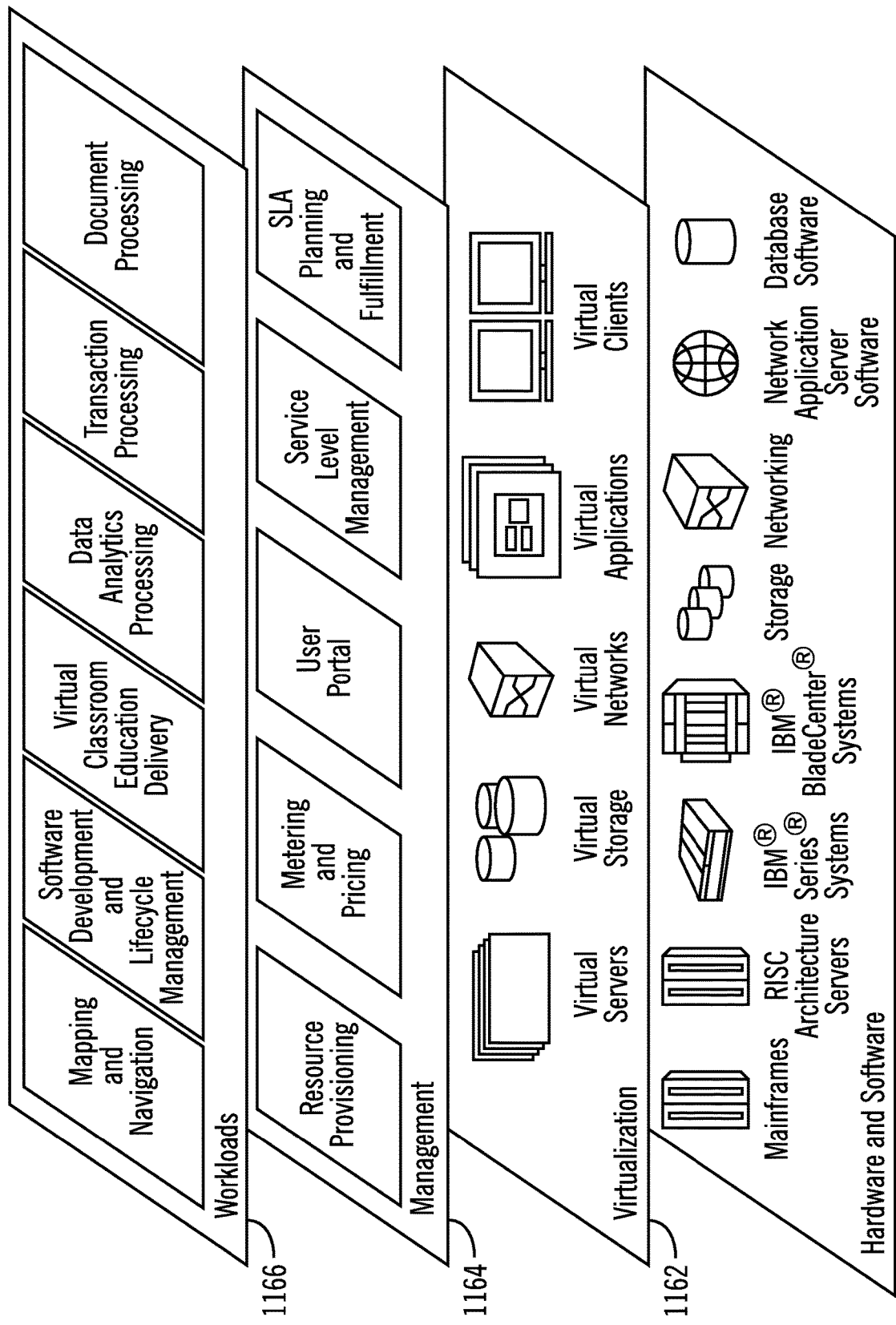
FIG. 11 depicts abstraction model layers in accordance with certain embodiments.

Referring now to FIG. 11, a set of functional abstraction layers provided by cloud computing environment 1050 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 1160 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 1162 provides an abstraction layer from which the following examples of virtual entities may be provided: virtual servers; virtual storage; virtual networks, including virtual private networks; virtual applications and operating systems; and virtual clients.

In one example, management layer 1164 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 1166 provides examples of functionality for which the cloud computing environment may be utilized. Examples of workloads and functions which may be provided from this layer include: mapping and navigation; software development and lifecycle management; virtual classroom education delivery; data analytics processing; transaction processing; and document processing.

Thus, in certain embodiments, software or a program, implementing document processing in accordance with embodiments described herein, is provided as a service in a cloud environment.

In certain embodiments, the computing device 100 and/or the content management system 120 has the architecture of computing node 910. In certain embodiments, the server 120 and/or the content management system 120 are part of a cloud environment. In certain alternative embodiments, the computing device 100 and/or the content management system 120 are not part of a cloud environment.

Additional Embodiment Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method implemented in a computer of a plurality of computers, comprising operations for:
    generating a combined filter expression that combines a first filter expression of a first application and a second filter expression of a second application;
    obtaining a first batch of documents from a database using the combined filter expression;
    sending, by a first process control thread, the first batch of documents to the first application, wherein the first application further selects a subset of the first batch of documents based on the first filter expression;
    in response to the first application completing processing of the selected subset, sending, by the first process control thread, the first batch of documents to the second application, wherein the second application further selects another subset of the first batch of documents based on the second filter expression; and
    obtaining a second batch of documents from the database using another combined filter expression, wherein a second process control thread sends the second batch of documents to one or more other applications.

2. The method of claim 1, wherein the first application and the second application are on different computers in a distributed environment.

3. The method of claim 1, wherein there are instances of a framework, and wherein each of the instances of the framework executes on a different computer to obtain one or more other documents.

4. The method of claim 1, wherein a sweep identifier is stored in a configuration data.

5. The method of claim 1, wherein the one or more documents are stored in a content management system.

6. The method of claim 1, wherein a Software as a Service (SaaS) is configured to perform the operations of the method.

7. The method of claim 1, further comprising an operation for:
- obtaining third batch of documents each having a key value higher than a high key value and a document type stored in a configuration data; and
- updating the high key value based on a highest key value of a document in the third batch of documents for use in selecting one or more other documents.

* * * * *